US007058505B1

(12) United States Patent
Milelli et al.

(10) Patent No.: US 7,058,505 B1
(45) Date of Patent: Jun. 6, 2006

(54) SYSTEM FOR NAVIGATION REDUNDANCY

(75) Inventors: Rosario J. Milelli, Pleasanton, CA (US); Victor F. Strachan, Thousand Oaks, CA (US); Charles H. Volk, Newbury Park, CA (US); Daniel A. Tazartes, West Hills, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 11/167,720

(22) Filed: Jun. 27, 2005

Related U.S. Application Data

(60) Provisional application No. 60/583,454, filed on Jun. 28, 2004.

(51) Int. Cl.
*G01C 21/26* (2006.01)

(52) U.S. Cl. .................. 701/200; 701/36; 701/213; 701/214; 701/215

(58) Field of Classification Search ............ 701/36, 701/200, 213, 214, 215, 216, 220, 301; 342/357.06–357.12; 348/118
See application file for complete search history.

(56) References Cited

U.S. PATENT DOCUMENTS

| | | | |
|---|---|---|---|
| 6,463,386 B1 * | 10/2002 | Mieno et al. ............... 701/213 |
| 6,768,944 B1 * | 7/2004 | Breed et al. ............... 701/301 |
| 6,836,719 B1 * | 12/2004 | Andersson et al. ........... 701/93 |
| 6,901,369 B1 * | 5/2005 | Cureton et al. ............... 705/1 |
| 6,919,842 B1 * | 7/2005 | Cho ..................... 342/357.06 |
| 6,952,181 B1 * | 10/2005 | Karr et al. ................ 342/457 |
| 2002/0198632 A1 | 12/2002 | Breed et al. |
| 2003/0083804 A1 | 5/2003 | Pilley et al. |
| 2003/0191568 A1 | 10/2003 | Breed |

* cited by examiner

*Primary Examiner*—Richard M. Camby
(74) *Attorney, Agent, or Firm*—Carmen B. Patti & Assoc., LLC

(57) ABSTRACT

An exemplary system that provides for navigation redundancy includes first and second navigation components adapted to determine first and second navigation parameters, respectively. A network component determines a relationship between the first and second navigation components, wherein the relationship describes a navigation solution for the second navigation component in terms of the first navigation component. A health monitor determines a health indicator for the second navigation component. The second navigation component determines a navigation solution for the second navigation parameters when the health indicator indicates a healthy condition. The network component determines a navigation solution for the second navigation parameters based on the relationship that describes behavior of the second navigation component in terms of the first navigation component when the health indicator indicates an unhealthy condition.

22 Claims, 6 Drawing Sheets

SYSTEM FOR NAVIGATION REDUNDANCY

This application claims the benefit of Provisional Application No. 60/583,454 filed Jun. 28, 2004.

BACKGROUND

A vehicle, for example, an airplane, a land vehicle, or a space vehicle, comprises multiple sensing systems. The sensing systems comprise one or more navigation components and one or more sensors. In one example, the navigation components compensate outputs of one or more of the sensors. For example, the navigation components determine navigation parameters, for example, orientation, velocity, and position, for the sensors and compensate the output of the sensors based on the navigation parameters. As one shortcoming, where the navigation component experiences one or more failures, the output of the sensor is inaccurately compensated, producing erroneous navigation information.

For example, in a synthetic aperture radar, an image is formed by combining received signals over a period of time while the radar is in motion. The navigation components determine navigation parameters for the sensors. The navigation components employ the navigation parameters to compensate the signals from the sensors. Where a navigation component is unable to determine navigation parameters for a sensor, the sensor provides erroneous signals, resulting in an inaccurate image.

In another example, the navigation components determine navigation parameters, for example, orientation, velocity, and position, of the vehicle with respect to a reference coordinate system. As another shortcoming, where the navigation component is unable to calculate the navigation parameters for the vehicle, the vehicle is unable to navigate. For example, a rocket employs a Global Positioning System ("GPS") unit to determine position of the rocket with respect to the Earth in order to calculate a flight path for the rocket. Upon occurrence of a failure in the navigation component, the rocket is unable to accurately calculate the flight path, and crashes into an undesirable location.

Thus, a need exists for compensating outputs of sensors of sensing systems on a vehicle upon failure of one or more navigation components of the sensing systems.

DESCRIPTION OF THE DRAWINGS

Features of exemplary implementations of the invention will become apparent from the description, the claims, and the accompanying drawings in which:

DETAILED DESCRIPTION

Figure 1:
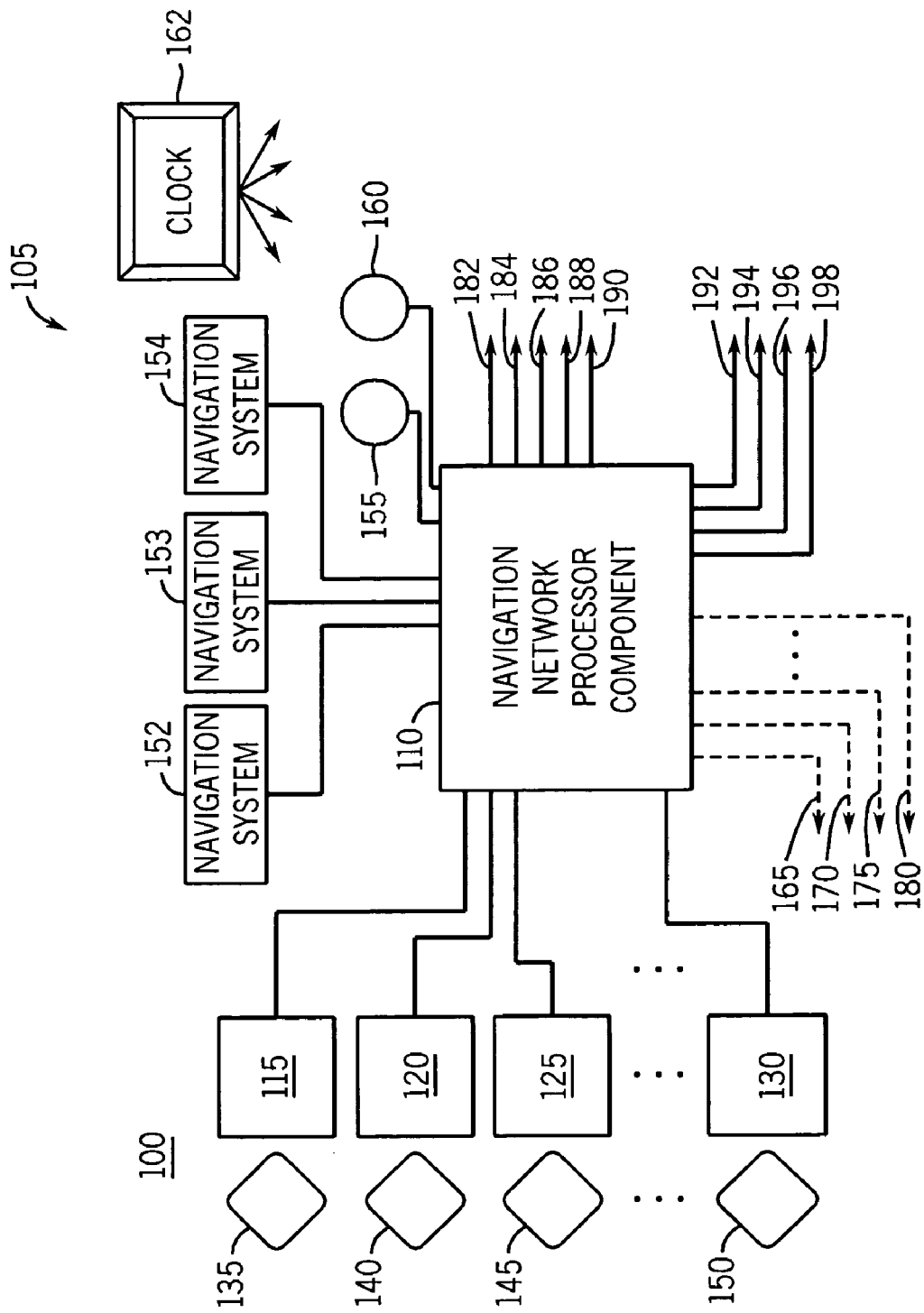
FIG. 1 is a representation of one implementation of an apparatus that comprises one or more vehicles, one or more navigation network processor components, one or more navigation systems, one or more navigation components, one or more sensors, and one or more external positioning components.

Turning to FIG. 1, an apparatus 100 in one example comprises one or more vehicles 105, one or more navigation network processor components 110, one or more navigation components 115, 120, 125, and 130, one or more navigation systems 152, 153, and 154, and one or more external positioning components 155 and 160. The vehicle 105 in one example comprises a car, a tank, an airplane, an airship, or a space vehicle. The navigation network component 110 establishes a coordinate system for the vehicle 105. In one example, the navigation network component 110 determines one or more navigation solutions for the navigation components 115, 120, 125, and 130. In one example, the vehicle 105 comprises one or more sensors 135, 140, 145, and 150. The navigation network component 110 determines one or more navigation parameters, for example, orientation, position, and velocity, for the sensors 135, 140, 145, and 150. In yet another example, the navigation network component 110 determines the navigation solutions for the navigation components 115, 120, 125, and 130 and the navigation parameters, for example, orientation, position, and velocity, for the sensors 135, 140, 145, and 150.

The navigation components 115, 120, 125, and 130 in one example comprise one or more inertial sensors, for example, three linear accelerometers and three gyros, to determine navigation parameters (e.g., orientation, position, and velocity) of the sensors 135, 140, 145 and 150. In one example, the navigation components 115, 120, 125, and 130 comprise one or more Inertial Navigation System ("INS"). In another example, the navigation components 115, 120, 125, and 130 comprise one or more Inertial Measurement Units ("IMUs"), as will be understood by those skilled in the art. The navigation components 115, 120, 125, and 130 in one example comprise varying degrees of accuracy. For example, the navigation components 115 and 120 comprise high performance navigation systems, for example, one nautical mile per hour inertial navigation systems or navigation systems augmented by one or more Global Positioning System ("GPS") units, and the navigation components 125 and 130 comprise lower performance navigation systems, for example, small tactical accuracy inertial measurement units. The navigation components 115, 120, 125, and 130 obtain navigation measurement data for the navigation components 115, 120, 125, and 130 and determine navigation parameters (i.e., orientations, positions, and velocities) for the sensors 135, 140, 145, and 150.

The one or more sensors 135, 140, 145, and 150 in one example comprise one or more synthetic aperture radars, one or more optical sensors, or one or more acoustic sensors. In one example, one or more of the sensors 135, 140, 145, and 150 are at locations of the navigation components 115, 120, 125, and 130. In another example, one or more of the sensors 135, 140, 145, and 150 are at locations distinct from the locations of the navigation components 115, 120, 125, and 130. For example, the sensors 135, 140, 145, and 150 are located in between one or more of the navigation components 115, 120, 125, and 130. The navigation system components 152, 153, and 154 in one example comprise one or more embedded GPS-inertial ("EGI") navigation systems. For example, the navigation system components 152, 153, and 154 comprise one or more LN100s from Northrop Grumman (Northrop Grumman Corporation Corporate Headquarters, 1840 Century Park East, Los Angeles, Calif. 90067-2199, (310) 553-6262; http://www.northropgrumman.com). The external positioning components 155 and 160 comprise a Global Positioning System ("GPS") receiver and a baro-altimeter. The navigation network processor component 110 and the navigation components 115, 120, 125, and 130 comprise an instance of a recordable data storage medium 101, as described herein.

The navigation network processor component 110 in one example receives navigation measurement data from the navigation components 115, 120, 125, and 130. The navigation network processor component 110 employs the navigation measurement data from the navigation components 115, 120, 125, and 130 to establish a coordinate system, for example, a first coordinate system, for the vehicle 105. The navigation network processor component 110 establishes a reference location for the vehicle 105 with respect to the coordinate system, for example, the first coordinate system. The navigation network processor component 110 employs the reference location for the vehicle 105 to determine one or more navigation solutions for the navigation components 115, 120, 125, and 130, and/or one or more navigational parameters (i.e., orientations, positions, and velocities) for the sensors 135, 140, 145, and 150, as will be appreciated by those skilled in the art. The navigation network processor component 110 determines the navigational parameters (i.e., orientations, positions, and velocities) for the sensors 135, 140, 145, and 150 with respect to the coordinate system established by the navigation network processor component 110, for example, the first coordinate system. The navigation network processor component 110 provides translated navigation parameters of the sensors 135, 140, 145, and 150 in the coordinate system established by the navigation network processor component 110 as illustrated by the outputs 182, 184, 186, and 188. The navigation network processor component 110 provides orientation of the coordinate system established by the navigation network processor component 110 as output 190.

The navigation network processor component 110 determines the navigation solutions for the navigation components 115, 120, 125, and 130 with respect to the coordinate system established by the navigation network processor component 110, for example, the first coordinate system. The navigation network processor component 110 sends as outputs 192, 194, 196, and 198, one or more navigation solutions for the navigation components 115, 120, 125, and 130 with respect to the coordinate system established by the navigation network processor component 110. The navigation solutions for the navigation components 115, 120, 125, and 130 comprise one or more standard navigation solutions and one or more replacement navigation solutions, as described herein.

The navigation network processor component 110 employs one or more navigation sensors to determine navigation measurement data for the vehicle 105. The navigation measurement data for the vehicle 105 in one example comprises: inertial measurement data, positioning measurement data, air speed measurement data, and/or pressure altitude measurement data. In one example, the navigation network processor component 110 employs one or more inertial sensors to determine inertial measurement data for the vehicle 105. In another example, the navigation network processor component 110 employs one or more pressure altitude sensors to determine pressure altitude measurement data for the vehicle 105. In yet another example, the navigation network processor component 110 employs one or more GPS units to determine GPS measurements for the vehicle 105. In yet another example, the navigation network processor component 110 employs one or more air speed sensors to determine air speed measurements for the vehicle 105. The navigation network processor component 110 employs the navigation measurement data to determine a navigation and orientation solution for the vehicle 105 that describes the location/position of the vehicle 105 with respect to a reference coordinate system, for example, the Earth.

The navigation network processor component 110 establishes a coordinate system, for example, a first coordinate system, with respect to the reference coordinate system based on the navigation measurement data for the vehicle 105, as will be understood by those skilled in the art. In one example, the navigation network processor component 110 employs data from the external position component 155, for example, GPS data, pressure altitude, or air data, to establish the coordinate system, as will be appreciated by those skilled in the art. In another example, the navigation network processor component 110 employs navigation measurement data from the navigation components 115, 120, 125, and 130, and positioning information from the external positioning components 155 and 160 to establish the coordinate system for the vehicle 105. In yet another example, the navigation network processor component 110 employs the navigation measurement data from the navigation components 115, 120, 125, and 130 to further refine the coordinate system established by the navigation network processor component 110 for the vehicle 105. The navigation network processor component 110 employs the coordinate system and the navigation measurement data for the vehicle 105 to describe the orientation of the vehicle 105 as a function of time.

The navigation network processor component 110 communicates with the navigation components 115, 120, 125, and 130 to describe the position of the sensors 135, 140, 145, and 150 relative to the coordinate system established by the navigation network processor component 110. The navigation network processor component 110 obtains navigation measurement data, for example, navigation measurement data, for the positions of the sensors 135, 140, 145, and 150 as a function of time from the navigation components 115, 120, 125, and 130. The navigation network processor component 110 comprises one or more error estimation components, for example, one or more Kalman filters, to estimate one or more errors in the navigation measurement data of the navigation components 115, 120, 125, and 130. The navigation network processor component 110 corrects the navigation measurement data of the navigation components 115, 120, 125, and 130 based on the estimations of the one or more errors. The navigation network processor component 110 provides the corrected navigation measurement data to the navigation components 115, 120, 125, and 130, as illustrated by outputs 165, 170, 175, and 180. The navigation components 115, 120, 125, and 130 employ the corrected navigation measurement data to improve estimations of navigation parameters (e.g., orientation, position, and velocity) of the sensors 135, 140, 145, and 150.

The navigation network processor component 110 translates the navigation measurement data of the navigation components 115, 120, 125, and 130 from coordinate systems established by the navigation components 115, 120, 125, and 130, for example, one or more second coordinate systems, to the coordinate system established by the navigation network processor component 110, for example, the first coordinate system, as will be appreciated by those skilled in the art. The navigation network processor component 110 provides navigational parameters for the navigation network processor component 110 as output 182. The navigation network processor component 110 provides translated navigation parameters for the sensors 135, 140, 145, and 150 in the coordinate system established by the navigation network processor component 110 as illustrated by the outputs 182, 184, 186, and 188. The navigation network processor component 110 provides the orientation of the coordinate reference system as output 190.

The navigation network processor component 110 estimates one or more lever arms (i.e. parameters used to model three dimensional distance vectors) between a reference location established by the navigation network processor component 110 and the navigation component 115, the reference location established by the navigation network processor component 110 and the navigation component 120, the reference location established by the navigation network processor component 110 and the navigation component 125, and the reference location established by the navigation network processor component 110 and the navigation component 130. The navigation components 115, 120, 125, and 130 employ the estimation of the lever arms to determine dynamic motion of the sensors 135, 140, 145, and 150 relative to the coordinate system established by the navigation network processor component 110.

The navigation network processor component 110 receives navigation measurement data as a function of time from the navigation components 115, 120, 125, and 130, the navigation systems 152, 153, and 154, and the external positioning components 155 and 160. The navigation network processor component 110 establishes a time base for the navigation measurement data. The navigation network processor component 110 synchronizes the navigation measurement data with the time base, as will be appreciated by those skilled in the art. In one example, the navigation component 115 provides a timestamp along with navigation measurement data for the navigation component 115. The navigation network processor component 110 adjusts the navigation measurement data for the navigation component 115 to the time base of the navigation network processor component 110. For example, the navigation network processor component 110 compares the timestamp from the navigation component 115 to the time base of the navigation network processor component 110. The navigation network processor component 110 in one example employs data interpolation and/or data extrapolation to adjust the navigation measurement data to the appropriate time. In another example, the navigation network processor component 110 and the navigation components 115, 120, 125, and 130, the navigation systems 152, 153, and 154, and the external positioning components 155 and 160, operate on a synchronized clock, for example, a clock 162. In yet another example, the navigation network processor component 110 and the navigation components 115, 120, 125, and 130, the navigation systems 152, 153, and 154, and the external positioning components 155 and 160, employ timing pulses to synchronize their respective navigation measurement data to the time base of the navigation network processor component 110.

The navigation components 115, 120, 125, and 130 determine navigation parameters (e.g., orientation, position, and velocity) of the sensors 135, 140, 145, and 150. The navigation components 115, 120, 125, and 130 compensate the output of the sensors 135, 140, 145, and 150 based on the orientation, position, and/or velocity of the sensors 135, 140, 145, and 150. The navigation components 115, 120, 125, and 130 communicate with the navigation network processor component 110 to provide the navigation measurement data of the navigation components 115, 120, 125, and 130 to the navigation network processor component 110. The navigation components 115, 120, 125, and 130 receive as input, corrected navigation measurement data of the navigation components 115, 120, 125, and 130 from the navigation network processor component 110 (e.g., the outputs 165, 170, 175, and 180). The navigation components 115, 120, 125, and 130 employ the corrected navigation measurement data of the navigation components 115, 120, 125, and 130 to describe the position of the sensors 135, 140, 145, and 150 with respect to the coordinate system established by the navigation network processor component 110. For example, the navigation component 115 employs the corrected navigation measurement data of the navigation component 115 to determine motion of the sensor 135 relative to the coordinate system established by the navigation network processor component 110.

Figure 2:
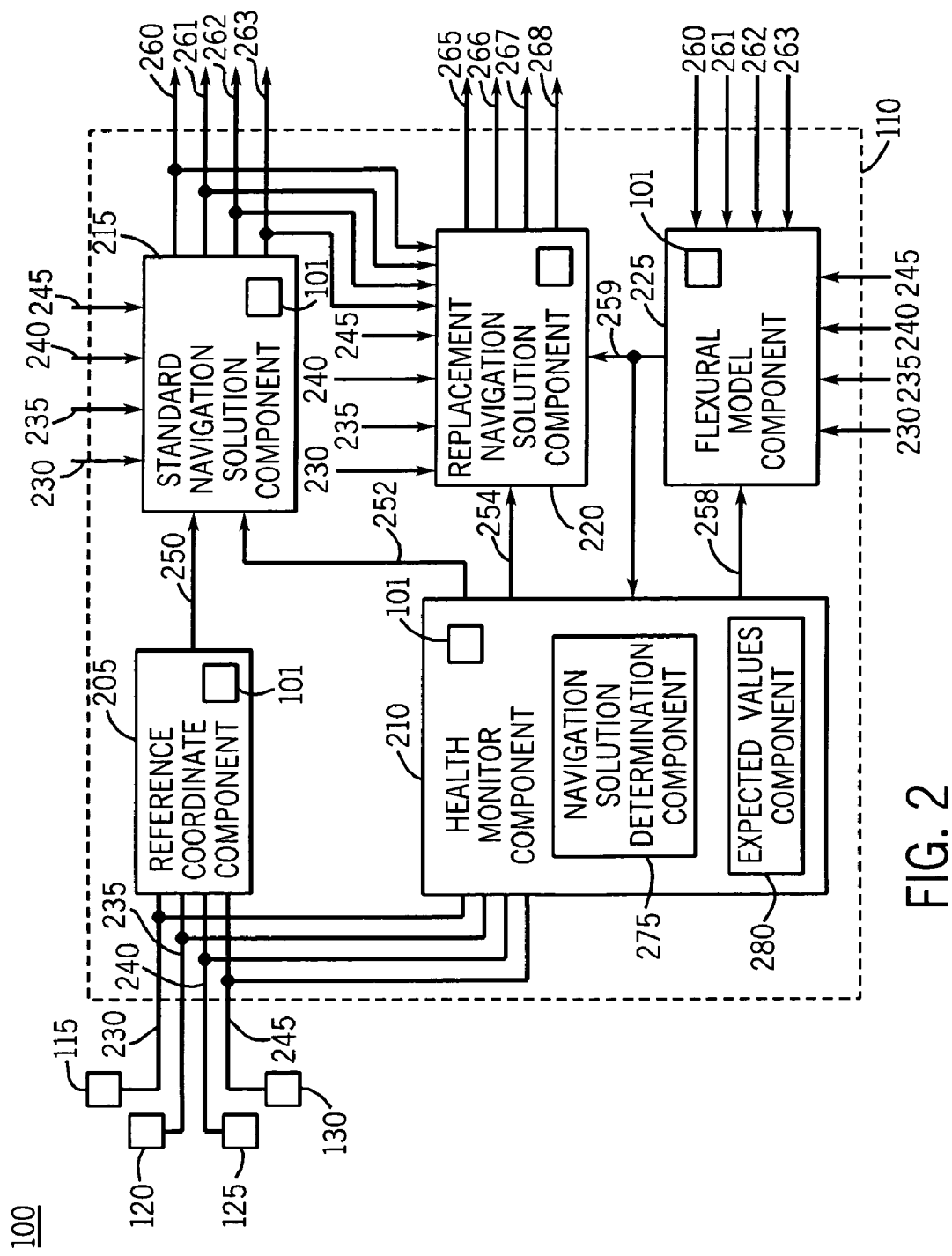
FIG. 2 is a representation of one implementation of one or more navigation solution determination components, one or more expected values components, one or more standard navigation solution components, one or more replacement navigation solution components, one or more flexural model components of the navigation network processor component of the apparatus of FIG. 1.

Turning to FIG. 2, the navigation network processor component 110 comprises one or more reference coordinate components 205, one or more health monitor components 210, one or more standard navigation solution components 215, one or more replacement navigation solution components 220, and one or more flexural model components 225. The reference coordinate component 205 in one example establishes a coordinate system for the vehicle 105. The health monitor component 210 in one example identifies failing navigation components from navigation measurement data obtained from the navigation components 115, 120, 125, and 130, as will be described herein. The standard navigation solution component 215 in one example determines navigation solutions for the navigation components 115, 120, 125, and 130. The replacement navigation solution component 220 in one example determines replacement navigation solutions for the navigation components 115, 120, 125, and 130. The flexural model component 225 determines one or more dynamic lever arms for one or more of the navigation components 115, 120, 125, and 130.

The standard navigation solution component 215 provides as outputs 260, 261, 262, and 263, one or more valid navigation solutions for one or more of the navigation components 115, 120, 125, and 130. The standard navigation solution component 215 provides the outputs 260, 261, 262, and 263 to the replacement navigation solution component 220. The replacement navigation solution component 220 provides as outputs 265, 266, 267, and 268, one or more replacement navigation solutions for one or more of the navigation components 115, 120, 125, and 130. The flexural model component 225 provides as output 259, the one or more dynamic lever arms for the one or more of the navigation components 115, 120, 125, and 130 to the replacement navigation solution component 220.

The reference coordinate component 205 takes as input, outputs 230, 235, 240, and 245 from the navigation components 115, 120, 125, and 130, respectively. The outputs 230, 235, 240, and 245 in one example comprise one or more physical parameters, for example, accelerations, angular rates, and temperatures. The reference coordinate component 205 provides orientation information for the vehicle 105 to the standard navigation solution component 215 as output 250. The health monitor component 210 takes as input, the outputs 230, 235, 240, and 245. The health monitor component 210 makes one or more comparisons of the outputs 230, 235, 240, and 245 of the navigation components 115, 120, 125, and 130 to one or more nominal outputs for the navigation components 115, 120, 125, and 130. The health monitor component 210 provides navigation component health indicators to the standard navigation solution component 215 and the replacement navigation solution component 220 based on the one or more comparisons for the navigation components 115, 120, 125, and 130, as outputs 252 and 254, respectively.

The health monitor component 210 in one example determines one or more health indicators for the navigation component 115, 120, 125, and 130. The health monitor component 210 in one example comprises one or more navigation solution determination components 275 and one or more expected values components 280. The navigation solution determination component 275 in one example generates one or more relationships for the navigation components 115, 120, 125, and 130 that describe behavior of a navigation component as a function of time with respect to the navigation components 115, 120, 125, and 130. In one example, the navigation solution determination component 275 generates a relationship for the navigation component 115 as a function of time with respect to the navigation components 120 and 125. For example, the navigation solution determination component 275 generates one or more equations as functions of time for the navigation component 115 in terms of the navigation components 120 and 125. In another example, the navigation solution determination component 275 generates a relationship for the navigation component 120 as a function of time with respect to the navigation components 115 and 130. For example, the navigation solution determination component 275 generates one or more equations as functions of time for the navigation component 120 in terms of the navigation components 115 and 130.

The expected values component 280 provides one or more expected values for the outputs 230, 235, 240, and 245 of the navigation components 115, 120, 125, and 130. For example, the outputs 230, 235, 240, and 245 comprise position, velocity, estimations of accelerometer or gyroscope drift errors, and magnitudes of sensed acceleration or angular rates, as will be appreciated by those skilled in the art. In one example, the expected values component 280 employs the one or more equations generated by the navigation solution determination component 275 and the lever arms 259 computed by the flexural model component 225 to determine the expected values for the outputs 230, 235, 240, and 245 of the navigation components 115, 120, 125, and 130. In another example, the expected values component 280 is pre-programmed with the expected values as a function of time for the outputs 230, 235, 240, and 245 of the navigation components 115, 120, 125, and 130.

In one example, the health monitor component 210 employs an Autonomous Integrity Monitored Extrapolation ("AIME") technique to generate the one or more health indicators for the navigation components 115, 120, 125, and 130. The health monitor component 210 sends as output 252, the health indicators to the standard navigation solution component 215. The health monitor component 210 sends as output 254, the health indicators to the replacement navigation solution component 220. In another example, the health monitor component 210 determines one or more differences between the values obtained from the outputs 230, 235, 240, and 245 with one or more expected values for the outputs 230, 235, 240, and 245. In yet another example, the health monitor component 210 quantifies the differences and sends the quantified differences to standard navigation solution component 215 and the replacement navigation solution component 220. In yet another example, the health monitor component 210 compares the differences to threshold values for the values of the outputs. The health monitor component 210 provides a health indicator based on the comparison of the difference to the threshold values. The health monitor component 210 sends as output 258, one or more indications of the health of the navigation component outputs 230, 235, 240, and 245 to the flexural model component 225. The flexural model component 225 employs the health indicators to determine which of the navigation component outputs 230, 235, 240, and/or 245 may be reliably used to compute a flexural model.

The flexural model component 225 in one example develops a model describing the reaction of the vehicle 105 in motion. The model in one example describes the displacement of the navigation components 115, 120, 125, and/or 130 relative to one another. The flexural model component 225 employs one or more rules, for example, one or more rules pertaining to lever arms, compliances, or resonance of the vehicle 105, and mechanics of the vehicle 105, to develop the model describing the reaction of the vehicle 105 in motion. The flexural model component 225 in one example estimates one or more lever arm parameters that describe three dimensional dynamic displacement vectors between the navigation components 115, 120, 125, and 130 and a reference location established by the navigation network processor component 110. The flexural model component 225 in one example receives as inputs, the outputs 230, 235, 240, and 245 (e.g., physical parameters, for example, acceleration, angular rates, and temperatures). The flexural model component 225 employs the outputs 230, 235, 240, and 245 to perform one or more estimations of forces, torques, deflections, and displacements of the navigation components 115, 120, 125, and 130 of the vehicle 105. The flexural model component 225 employs the one or more estimations to determine behaviors for dynamic lever arms of the navigation components 115, 120, 125, and 130.

The flexural model component 225 in one example receives as inputs, the outputs 260, 261, 262, and 263 from the standard navigation solution component 215. The outputs 260, 261, 262, and 263 in one example comprise navigation solutions and/or navigation measurement data. The flexural model component 225 in one example performs one or more comparisons of the flexural model to the navigation solutions 260, 261, 262, and 263 to provide further refinement of the flexural model. In one example, the flexural model component 225 comprises a deterministic mechanical model. In another example, the flexural model component 225 comprises a flexible adaptive form, for example, a neural network.

The flexural model component 225 receives as input, output 258 from the health monitor component 210. The flexural model component 225 employs the output 258 to determine which of the navigation component outputs 230, 235, 240, and/or 245 and which of the standard navigation solutions 260, 261, 262, and/or 263 are reliable enough to employ in calculating or updating the flexural model. The flexural model component 225 provides as the output 259, the one or more dynamic lever arms for the one or more of the navigation components 115, 120, 125, and 130 to the replacement navigation solution component 220. The replacement navigation solution component 220 employs the output 259 and the outputs 260, 261, 262, and 263 to estimate the navigation solutions for unhealthy navigation components, for example, the navigation component 120.

The replacement navigation solution component 220 in one example takes as input, the outputs 254, 259, 260, 261, 262, and 263. The replacement navigation solution component 220 produces one or more replacement solutions 265, 266, 267, and 268 for one or more of the navigation components 115, 120, 125, and 130. The replacement navigation solution component 220 in one example monitors the outputs 230, 235, 240, and 245 of the navigation components 115, 120, 125, and 130. The replacement navigation solution component 220 learns to simulate an output of a navigation component based upon the outputs of the remaining navigation components. The replacement navigation solution component 220 develops one or more relationships between the outputs 230, 235, 240, and 245 the describe the behavior of the outputs 230, 235, 240, and 245 with respect to one or more of the outputs 230, 235, 240, and 245. For example, the replacement navigation solution component 220 comprises one or more neural networks that monitor the outputs 230, 235, 240, and 245. The replacement navigation solution component 220 monitors the outputs 230, 235, 240, and 245 to develop one or more relationships that describe the behavior of the output 230 with respect to the outputs 235, 240, and/or 245. The replacement navigation solution component 220 employs the one or more relationships to simulate the output 230 of the navigation component 115. As the replacement navigation solution component 220 develops the one or more relationships, the replacement navigation solution component 220 verifies the one or more relationships by comparing a value obtained by use of the one or more relationships with values of the outputs 230, 235, 240, and 245 from the navigation components 115, 120, 125, and 130.

For example, the replacement navigation solution component 220 simulates the output 230 of the navigation component 115. The replacement navigation solution component 220 monitors the outputs 235, 240, and 245 over time. The replacement navigation solution component 220 constructs one or more equations, or systems of equations, as a function of time from the outputs 235, 240, and 245 that describes the behavior of the output 230 in terms of the outputs 235, 240, and 245, as a function of time. The replacement navigation solution component 220 performs a comparison of a value obtained from the output 230 at a time period, for example, a current value for the output 230, with a value obtained from the one or more equations at that time period. The replacement navigation solution component 220 adjusts the one or more equations that describe the output 230 in terms of the outputs 235, 240, and 245 based upon the comparison, as will be appreciated by those skilled in the art.

Through employment of one or more relationships that describe the behavior of the navigation components 115, 120, 125, and 130 in terms of the navigation components 115, 120, 125, and 130, the replacement navigation solution component 220 provides redundant navigation solutions for the outputs 230, 235, 240, and 245, upon failure of one or more of the navigation components 115, 120, 125, and 130. For example, upon failure of the navigation component 115, the replacement navigation solution component 220 employs the one or more relationships for the output 230 to construct a value for the output 230 with reasonable accuracy.

Figure 3:
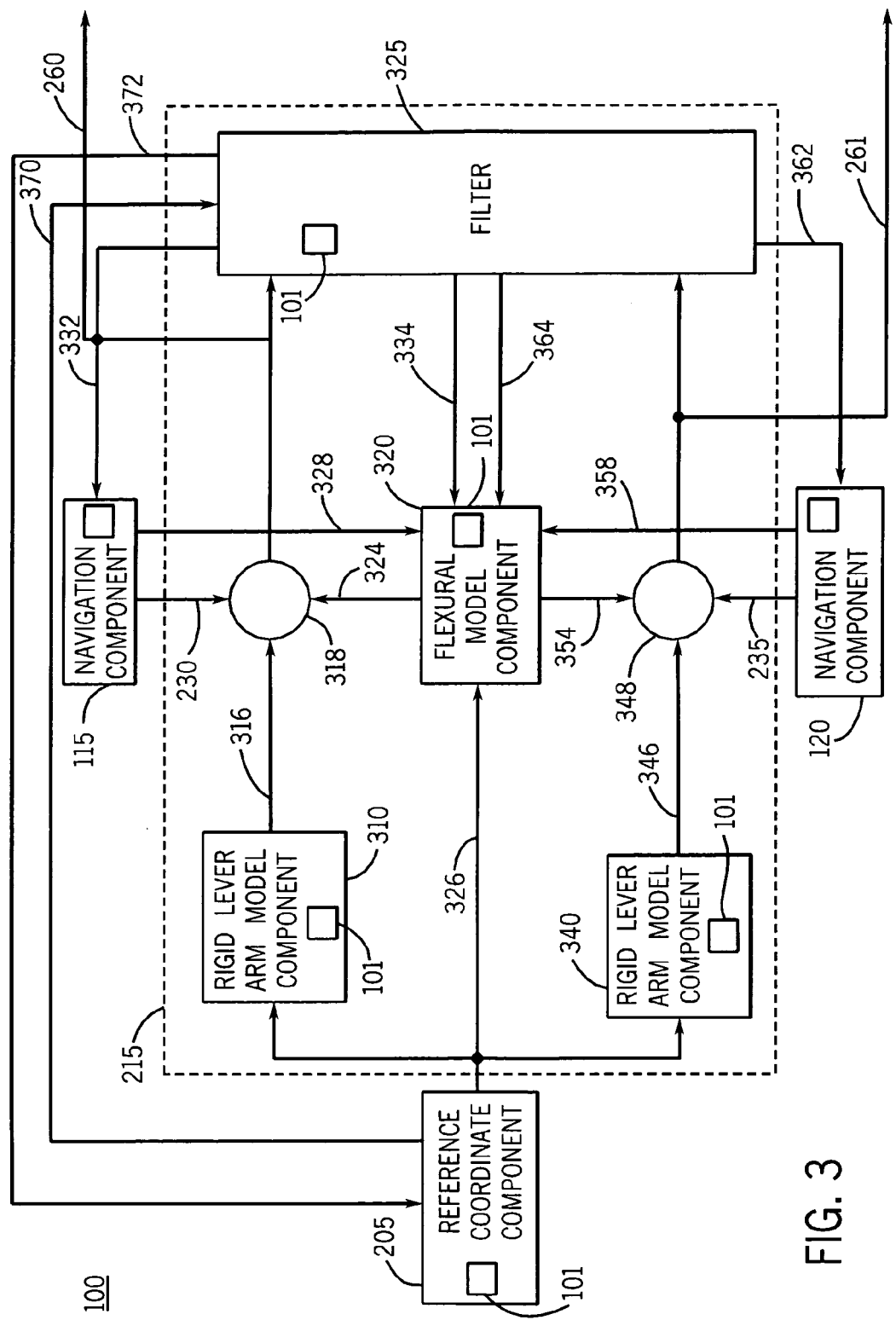
FIG. 3 is a representation of one implementation of one or more reference coordinate components and one or more rigid lever arm model components of the navigation network processor component, the navigation components, the sensors, the external positioning components, one or more incremental dynamic lever arm correction components, and one or more filters of the apparatus of FIG. 1.

Turning to FIG. 3, the standard navigation solution component 215 in one example comprises one or more rigid lever arm model components 310 and 340, one or more summing nodes 318 and 348, one or more flexural model components 320, and one or more filters 325. The rigid lever arm model component 310 comprises a base-line static position for the navigation component 115. The rigid lever arm model component 310 determines a base-line static lever arm for the navigation component 115 based on the base-line static position. The base-line static lever arm for the navigation component 115 comprises a three-dimensional position distance, or vector, between a reference location established by the navigation network processor component 110 and the navigation component 115. The rigid lever arm model component 310 cooperates with the reference coordinate component 205 to project the base-line static lever arm for the navigation component 115 in the coordinate system established by the reference coordinate component 205 to determine a static lever arm for the navigation component 115. The rigid lever arm model component 310 sends the static lever arm for the navigation component 115 as output 316 to a summing node 318.

The navigation component 115 determines navigation measurement data for the navigation component 115 in reference to a coordinate system established by the navigation component 115, for example, a second coordinate system. The navigation component 115 sends as output 230, the navigation measurement data for the navigation component 115 in reference to the coordinate system established by the navigation component 115 to the summing node 318. The summing node 318 combines the output 316 from the rigid lever arm model component 310 with the output 230 from the navigation component 115 to produce as output 260, navigation measurement data for the navigation component 115 in reference to the coordinate system established by the reference coordinate component 205, for example, the first coordinate system.

The output 260 comprising the navigation measurement data for the navigation component 115 in reference to the coordinate system established by the reference coordinate component 305 is enhanced through employment of a flexural model component 320. The flexural model component 320 comprises a model that describes the flexing, or bending, of the structure of the vehicle 105 as a function of time while the vehicle 105 is in motion. Based on estimations of the positions of the navigation components 115, 120, 125, and 130, the flexural model component 320 expresses the relative displacement of any point along the structure of the vehicle. For example, the flexural model component 320 takes as input one or more lever arm parameters of the distances between a reference location established by the navigation network processor component 110 and each of the navigation components 115, 120, 125, and 130 as a function of time. The flexural model component 320 comprises one or more equations describing the reaction of the vehicle 105 during motion. For example, the flexural model component 320 comprises equations describing the bending of the structure of the vehicle 105 as a function of time. The flexural model component 320 applies lever arm parameters to the equations to generate an equation describing the relative displacement of any sensor along the structure of the vehicle 105 as a function of time. In one example, the flexural model component 320 is programmed with the equations describing the bending of the structure of the vehicle 105 as a function of time. In another example, the flexural model component 320 employs one or more neural networks that cooperate to develop a model describing the displacement of the sensors 135, 140, 145, and 150 relative to one another. The flexural model component 320 provides as output 324, equations describing the relative displacement of the sensor 135 along the structure of the vehicle 105 as a function of time.

For example, the flexural model component 320 comprises one or more incremental dynamic lever arm correction components. The incremental dynamic lever arm correction components comprise models describing reactions of the vehicle 105 during motion. The incremental dynamic lever arm correction components employ the models to provide positions for the navigation components 115, 120, 125, and 130 in relation to the reactions of the vehicle 105 during motion. For example, while in motion, the vehicle 105 reacts by bending. The bending of the vehicle 105 alters a lever arm (i.e., the three-dimensional distance vector) between the master navigation component 110 and the navigation component 115. As the vehicle 105 bends, the lever arm between the master navigation component 110 and the navigation component 115 changes.

In one example, the flexural model component 320 in one example takes as input, output 326 from the reference coordinate component and output 328 from the navigation component 115. The incremental dynamic lever arm correction components in one example employ the outputs 326 and 328 to determine a dynamic lever arm for the navigation component 115 in reference to the coordinate system established by the reference coordinate component 205. The incremental dynamic lever arm correction components send the dynamic lever arm for the navigation component 115 to the summing node 318. The summing node 318 combines the outputs 316, 230, and 324 to produce the output 260. Thus, the summing node 318 generates the output 260 as comprising more accurate navigation measurement data for the navigation component 115 in reference to the coordinate system established by the reference coordinate component 205 for the vehicle 105 in motion. The output 324 of the incremental dynamic lever arm correction components obtains more accuracy through employment of the filter 325, for example, a Kalman filter, as will be discussed herein.

The filter 325 receives as input, the output 260 from the summing node 318. The filter 330 compares the output 260 for a given timestamp (i.e., the navigation measurement data for the navigation component 115 in reference to the coordinate system established by the reference coordinate component 205) with the navigation measurement data from the reference coordinate component 205 at the given timestamp. The filter 325 estimates errors in the output 260. The filter 325 provides as output 332, corrected navigation measurement data for the navigation component 115 in reference to the coordinate system established by the reference coordinate component 205. The navigation component 115 employs the output 332 to determine orientation, position, and velocity of the sensor 135 with respect to the coordinate system established by the reference coordinate component 205. The navigation component 115 employs the output 332 to adjust the coordinate system established by the navigation component 115. In addition, the filter 325 sends as output 334, the corrected navigation measurement data for the navigation component 115 in reference to the coordinate system established by the reference coordinate component 205 to the flexural model component 320. The flexural model component 320 employs the output 334 to correct the output 324, the dynamic lever arm for the navigation component 115. Thus, the flexural model component 320, the navigation component 115, and the filter 325 cooperate to iteratively align a coordinate system of the navigation component 115 with the coordinate system established by the reference coordinate component 205.

The navigation component 120, the sensor 140, the reference coordinate component 205, rigid lever arm model component 340, summing node 348, the flexural model component 320, and outputs 235, 346, 261, 354, 358, 362, and 364, interact in a similar fashion to the navigation component 115, the sensor 135, the reference coordinate component 205, the rigid lever arm model component 310, the summing node 318, the flexural model component 320, and the outputs 230, 316, 260, 324, 328, 332, and 334. The reference coordinate component 205, the rigid lever arm model components 310 and 340, the flexural model components 320, and the filter 325, comprise one or more instances of a recordable data storage medium 101, as described herein.

Referring still to FIG. 3, the navigation component 115 sends as output 328, the navigation measurement data for the navigation component 115 to the flexural model component 320. The flexural model component 320 employs the output 328 to provide increased accuracy of the dynamic lever arm for the navigation component 120 in reference to the coordinate system established by the reference coordinate component 205. The navigation component 120 sends as output 358, the navigation measurement data for the navigation component 120 to the flexural model component 320. The flexural model component 320 employs the output 358 to provide increased accuracy of the dynamic lever arm for the navigation component 115 in reference to the coordinate system established by the reference coordinate component 205.

The filter 325 receives as input, navigation measurement data from the reference coordinate component 205, and the navigation components 115 and 120. The filter 325 receives as input, output 370 from the reference coordinate component 205, the output 260 from the navigation component 115, and the output 261 from the navigation component 120. The filter 325 estimates errors in navigation measurement data received from the reference coordinate component 205, and the navigation components 115 and 120. The filter 325 corrects the errors and sends as output 372, the corrected navigation measurement data with respect to the coordinate system established by the reference coordinate component 205 to the reference coordinate component 205. The reference coordinate component 205 employs the output 372 to adjust a coordinate system established by the reference coordinate component 205. For example, the reference coordinate component 205 employs the output 372 to adjust a base-line coordinate system established by the reference coordinate component 205. The filter 325 and the reference coordinate component 205 cooperate to align the coordinate system established by the reference coordinate component 205 and the coordinate system established by the filter 325. The filter 325 sends as the outputs 332, 334, 362, and 364, the corrected navigation measurement data with respect to the coordinate system established by the reference coordinate component 205 to the reference coordinate component 205, the navigation components 115 and 120, and the flexural model component 320.

An illustrative description of exemplary operation of the apparatus 100 is presented, for explanatory purposes.

Figure 4:
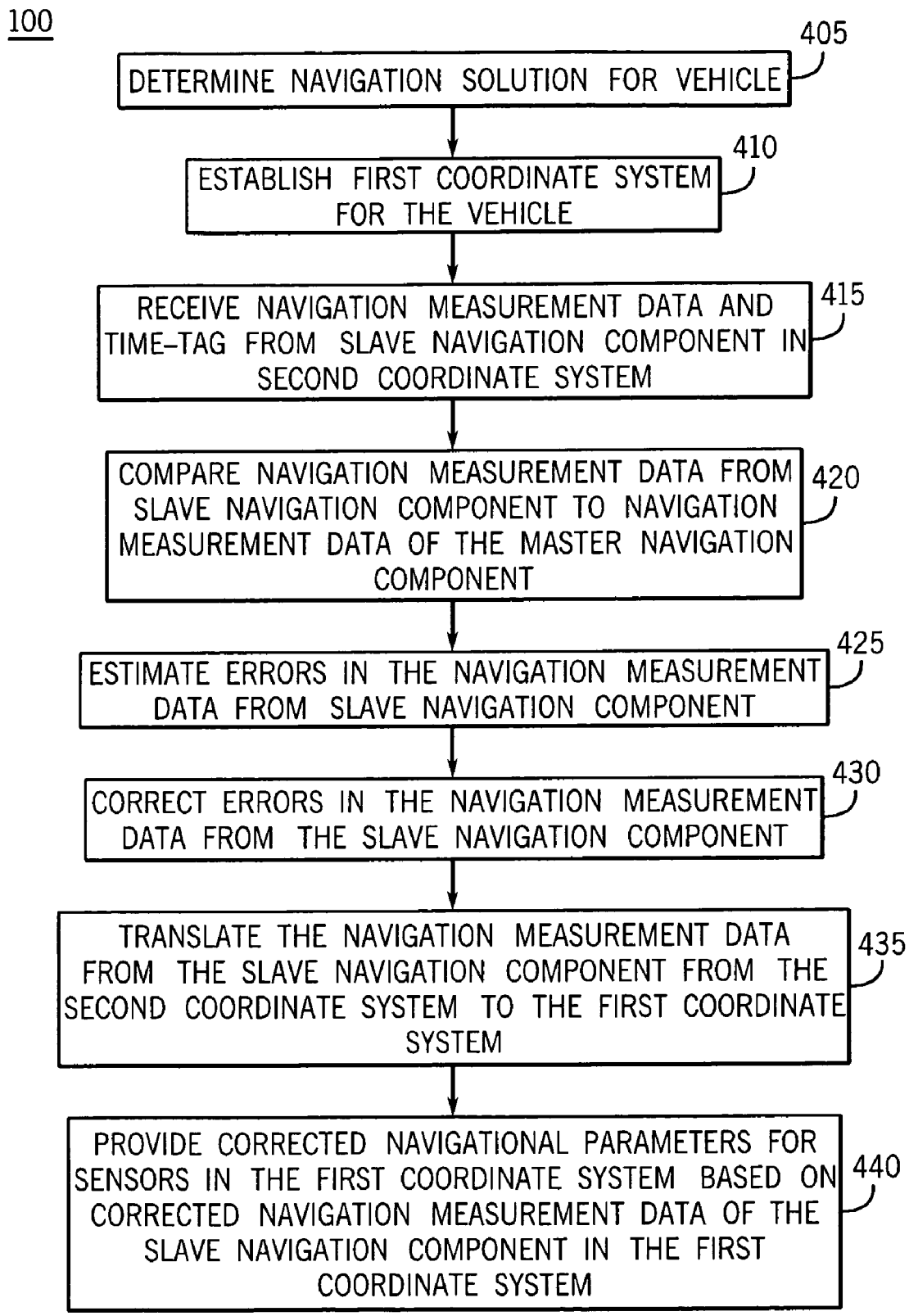
FIG. 4 is a representation of an exemplary process flow for providing corrected navigational parameters for the sensors from the navigation network processor component to the navigation components of the apparatus of FIG. 1.

Turning to FIGS. 2–4, in STEP 405, the navigation network processor component 110 determines a navigation solution as a function of time for the vehicle 105. In STEP 410, the reference coordinate component 205 employs navigation measurement data and optional data from the external positioning component 155 to establish a coordinate system for the vehicle 105, for example, a first coordinate system, in relation to the Earth. In STEP 415, the reference coordinate component 205 receives navigation measurement data with respect to a coordinate system established by the navigation component 115, for example, a second coordinate system, and time-tag from the navigation component 115 for the sensor 135. The reference coordinate component 205 employs the time-tag to determine the navigation measurement data of the reference coordinate component 205 at a time described by the time-tag. In STEP 420, the reference coordinate component 205 compares the navigation measurement data of the navigation component 115 at the time described by the time-tag to the navigation measurement data of the reference coordinate component 205 at the time described by the time-tag. The navigation measurement data of the reference coordinate component 205 at the time described by the time-tag in one example comprises navigation measurement data of the reference coordinate component 205 adjusted by one or more lever arms between the reference coordinate component 205 and the navigation components 115, 120, 125, and 130, as described herein.

In STEP 425, the reference coordinate component 205 and the filter 325 estimate errors in the navigation measurement data from the navigation component 115. In STEP 430, the filter 325 corrects the errors in the navigation measurement data from the navigation component 115. In STEP 435, the filter 325 translates the corrected navigation measurement data for the navigation component 115 from the coordinate system established by the navigation component 115, (e.g., the second coordinate system) to the coordinate system established by the reference coordinate component 205 (e.g., the first coordinate system). In STEP 440, the summing node 318 employs the corrected and translated navigation measurement data for the navigation component 115 in the first coordinate system to provide navigation parameters for the sensor 135, for example, orientation, position, and velocity, in the coordinate system established by the reference coordinate component 205 of the navigation network processor component 110.

Figure 5:
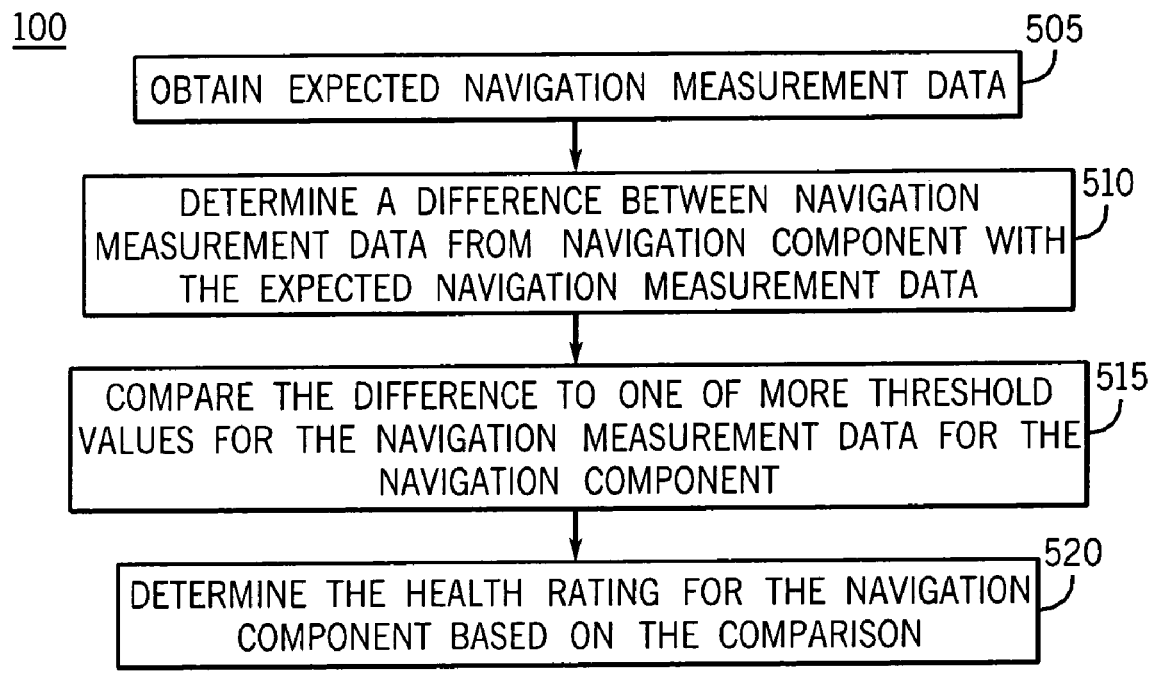
FIG. 5 is another representation of an exemplary process flow for determining one or more health indicators of the navigation components, the navigation systems, and the sensors of the apparatus of FIG. 1.

Turning to FIG. 5, in STEP 505, the health monitor component 210 obtains navigation measurement data of the output 230 from the navigation component 115. In STEP 510, the health monitor component 210 determines a difference between the navigation measurement data of the output 230 and expected navigation measurement data of the output 230. For example, the difference between the orientation of the navigation component 115 and the expected orientation of the navigation component 115 is three degrees. In STEP 515, the health monitor component 210 quantifies the difference based upon a percentage of the difference. For example, the difference of three degrees is within a tolerance limit for the navigation component 115. In STEP 520, the health monitor component 210 determines the health indicator for the navigation component 115 based on the quantified difference. The health monitor component 210 provides a ninety-eight percent health indicator for the navigation component 115.

Figure 6:
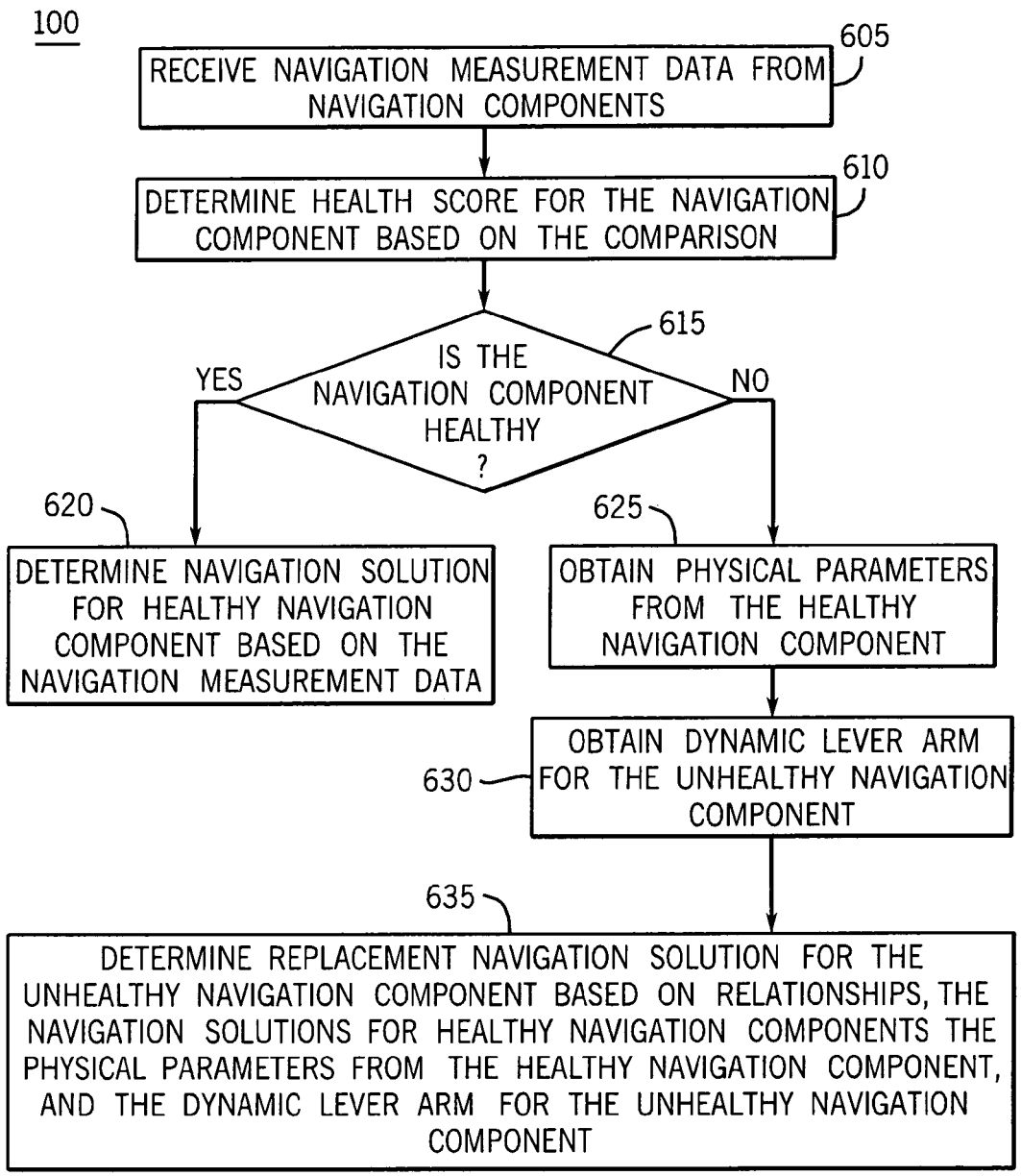
FIG. 6 is a representation of an exemplary process flow for determining one or more replacement navigation solutions for the navigation components, the navigation systems, and the sensors of the apparatus of FIG. 1.

Turning to FIGS. 1, 2, and 6, the navigation network component 110 determines navigation solutions for the navigation components 115 and 120. In STEP 605, the navigation network component 110 receives navigation measurement data from the navigation components 115 and 120. In STEP 610, the health monitor component 210 determines that the navigation component 115 is healthy and that the navigation component 120 is unhealthy. In STEP 615, the standard navigation solution component 215 determines a navigation solution for the navigation component 115. In STEP 620, the standard navigation solution component 215 provides the navigation solution for the navigation component 115 as output 260. In STEP 625, the flexural model component 225 obtains physical parameters measured by the healthy navigation component, for example, the navigation component 115. In STEP 630, the replacement navigation solution component 220 obtains a dynamic lever arm for the unhealthy navigation component, for example, the navigation component 220, from the flexural model component 225. In STEP 635, the replacement navigation solution component 220 determines the replacement navigation solution for the navigation component 220 based on a relationship between the navigation component 115 (i.e., the healthy navigation component) and the navigation component 120 (i.e., the unhealthy navigation component), the navigation solution for the navigation component 115, the physical parameters for the navigation component 120, and the dynamic lever arm for the navigation component 120. The replacement navigation solution component 220 provides the replacement navigation solution as output 265.

The apparatus 100 in one example comprises a plurality of components such as one or more of electronic components, hardware components, and computer software components. A number of such components can be combined or divided in the apparatus 100. An exemplary component of the apparatus 100 employs and/or comprises a set and/or series of computer instructions written in or implemented with any of a number of programming languages, as will be appreciated by those skilled in the art.

The apparatus 100 in one example employs one or more computer-readable signal-bearing media. The computer-readable signal-bearing media store software, firmware and/or assembly language for performing one or more portions of one or more embodiments of the invention. Examples of a computer-readable signal-bearing medium for the apparatus 100 comprise the recordable data storage medium 101 of the navigation network processor component 110, the navigation components 115, 120, 125, and 130, the flexural model component 225, the reference coordinate component 205, the rigid lever arm model components 310 and 340, and the filter 320. The computer-readable signal-bearing medium for the apparatus 100 in one example comprise one or more of a magnetic, electrical, optical, biological, and atomic data storage medium. For example, the computer-readable signal-bearing medium comprise floppy disks, magnetic tapes, CD-ROMs, DVD-ROMs, hard disk drives, and electronic memory. In another example, the computer-readable signal-bearing medium comprises a modulated carrier signal transmitted over a network comprising or coupled with the apparatus 100, for instance, one or more of a telephone network, a local area network ("LAN"), a wide area network ("WAN"), the Internet, and a wireless network.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

What is claimed is:

1. An apparatus, comprising:
    a first one or more navigation components of a plurality of navigation components;
    a second one or more navigation components of the plurality of navigation components;
    a navigation network component that employs one or more estimation means to develop one or more relationships for the plurality of navigation components, wherein each of the one or more relationships describes a navigation solution for a navigation component of the plurality of navigation components in terms of one or more of the plurality of navigation components; and
    a health monitor component that determines one or more health indicators for the plurality of navigation components;
    wherein the navigation network component determines one or more navigation solutions for the first one or more navigation components;
    wherein the navigation network component determines one or more navigation solutions for the second one or more navigation components through employment of one or more of the one or more relationships and the one or more navigation solutions for the first one or more navigation components, wherein the one or more of the one or more relationships comprise one or more relationships that describe behavior of each of the second one or more navigation components in terms of one or more of the first one or more navigation components and one or more of the second navigation components.

2. The apparatus of claim 1 wherein the estimation consists of a neural network.

3. The apparatus of claim 1 wherein the estimation consists of Kalman filter.

4. The apparatus of claim 1 wherein the first one or more navigation components comprise one or more health indicators indicating a healthy condition for the first one or more navigation components.

5. The apparatus of claim 4 wherein the second one or more of the plurality of navigation components comprise one or more health indicators indicating an unhealthy condition for the second one or more of the plurality of navigation components.

6. An apparatus, comprising:
    a first and second navigation component each adapted to determine first and second navigation parameters, respectively;
    a network component adapted to determine relationships between the first and second navigation components, wherein the relationship describes a navigation solution for the second navigation component in terms of the first navigation component; and
    a health monitor component that determines a health indicator for at least the second navigation component;
    wherein the second navigation component determines a navigation solution for the second navigation parameters when the health indicator is equal to or greater than a first threshold indicating a health condition;
    wherein the network component determines a navigation solution for the second navigation parameters based on the relationship that describes behavior of the second navigation component in terms of the first navigation component when the health indicator is less than the first threshold indicating an unhealthy condition.

7. The apparatus of claim 6 wherein the thresholds used by the health indicator corresponding to healthy and unhealthy conditions are different.

8. The apparatus of claim 6 further comprising a plurality of navigation components in addition to the first and second navigation components where each of the plurality of navigation components is adapted to determine respective navigation parameters;
    the network component adapted to determine relationships among the navigation components, wherein the relationship describes a navigation solution for each of the navigation components in terms of one or more other navigation components; and
    the health monitor component that determines a health indicator for said plurality of navigation components;
    wherein each navigation component determines a navigation solution for its respective navigation parameters when the corresponding health indicator indicates a healthy condition;
    wherein the network component determines a navigation solution for certain navigation parameters associated with a certain navigation component based on the relationship that describes behavior of the certain navigation component in terms of a different navigation component when the health indicator of the certain navigation component indicates an unhealthy condition.

9. The apparatus of claim 6 further comprising a lever arm component that determines a lever arm solution for the second navigation component in terms of the first navigation component, wherein the network component determines a navigation solution for the second navigation parameters based on the lever arm solution that describes behavior of the second navigation component in terms of the first navigation component when the health indicator indicates an unhealthy condition.

10. The apparatus of claim 9 wherein the lever arm component obtains physical parameters of the second navigation component and determines the lever arm solution for the second navigation component in terms of the first navigation component based on the physical parameters.

11. The apparatus of claim 9 wherein the lever arm component determines a dynamic lever arm solution for the second navigation component in terms of the first navigation component.

12. A method implemented by a computing system for computing navigation information comprising the steps of:
    determining first and second navigation parameters that correspond to first and second navigation components, respectively;
    determining relationships between the first and second navigation components, wherein the relationship describes a navigation solution for the second navigation component in terms of the first navigation component; and
    determining a health indicator for at least the second navigation component;
    wherein a navigation solution for the second navigation parameters is determined by the second navigation component when the health indicator is equal to or greater than a first threshold indicating a healthy condition;
    wherein a navigation solution for the second navigation parameters is determined by the network component based on the relationship that describes behavior of the second navigation component in terms of the first navigation component when the health indicator is less than the first threshold indicating an unhealthy condition.

13. The method of claim 12 further comprising the steps of:
   determining a plurality of respective navigation parameters for corresponding navigation components in addition to the first and second navigation components;
   determining relationships among the plurality of navigation components, wherein each relationship describes a navigation solution for each of the navigation components in terms of one or more other navigation components; and
   determining a health indicator for said plurality of navigation components;
   wherein a navigation solution is determined for a navigation component based on its respective navigation parameters when the corresponding health indicator indicates a healthy condition;
   wherein a navigation solution is determined for a certain navigation component, having a corresponding health indicator indicating an unhealthy condition, based on the relationship that describes behavior of the certain navigation component in terms of a different navigation component where the health indicator of the different navigation component indicates a healthy condition.

14. The method of claim 12 further comprising the step of determining a lever arm solution for the second navigation component in terms of the first navigation component, wherein the network component determines a navigation solution for the second navigation parameters based on the lever arm solution that describes behavior of the second navigation component in terms of the first navigation component when the health indicator indicates an unhealthy condition.

15. The method of claim 14 wherein the step of determining a lever arm solution includes obtaining physical parameters of the second navigation component and determining the lever arm solution for the second navigation component in terms of the first navigation component based on the physical parameters.

16. The method of claim 14 wherein the step of determining a lever arm solution includes determining a dynamic lever arm solution for the second navigation component in terms of the first navigation component.

17. The method of claim 12 further determining a plurality of lever arm solutions for additional navigation components, said lever arm solutions being estimated dynamically between navigation components when their respective health indicators indicate a healthy condition.

18. An article, comprising:
   one or more computer-readable signal-bearing media; and
   means in the one or more media for determining first and second navigation parameters that correspond to first and second navigation components, respectively;
   means in the one or more media for determining relationships between the first and second navigation components, wherein the relationship describes a navigation solution for the second navigation component in terms of the first navigation component; and
   means in the one or more media for determining a health indicator for at least the second navigation component;
   wherein a navigation solution for the second navigation parameters is determined when the health indicator for the second navigation component indicates a healthy condition;
   wherein a navigation solution for the second navigation parameters is determined based on the relationship that describes behavior of the second navigation component in terms of the first navigation component when the health indicator indicates an unhealthy condition.

19. The article of claim 18 further comprising:
   means in the one or more media for determining a plurality of respective navigation parameters for corresponding navigation components in addition to the first and second navigation components;
   means in the one or more media for determining relationships among the plurality of navigation components, wherein each relationship describes a navigation solution for each of the navigation components in terms of another navigation component; and
   means in the one or more media for determining a health indicator for said plurality of navigation components;
   wherein a navigation solution is determined for a navigation component based on its respective navigation parameters when the corresponding health indicator is equal to or greater than a first threshold indicating a healthy condition;
   wherein a navigation solution is determined for a certain navigation component, having a corresponding health indicator that is less than the first threshold indicating an unhealthy condition, based on the relationship that describes behavior of the certain navigation component in terms of a different navigation component where the health indicator of the different navigation component indicates a healthy condition.

20. The article of claim 18 further comprising means in the one or more media for determining a lever arm solution for the second navigation component in terms of the first navigation component, wherein the navigation solution for the second navigation parameters is based on the lever arm solution that describes behavior of the second navigation component in terms of the first navigation component when the health indicator indicates an unhealthy condition.

21. The article of claim 20 wherein means in the one or more media for determining a lever arm solution includes means in the one or more media for obtaining physical parameters of the second navigation component and determining the lever arm solution for the second navigation component in terms of the first navigation component based on the physical parameters.

22. The article of claim 20 wherein means in the one or more media for determining a lever arm solution includes means in the one or more media for determining a dynamic lever arm solution for the second navigation component in terms of the first navigation component.

* * * * *